United States Patent
Kobayashi et al.

(10) Patent No.: US 8,162,087 B2
(45) Date of Patent: Apr. 24, 2012

(54) CONSTRUCTION MACHINE

(75) Inventors: Tamio Kobayashi, Kasama (JP); Makoto Matsushita, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 162 days.

(21) Appl. No.: 12/672,081

(22) PCT Filed: Feb. 10, 2009

(86) PCT No.: PCT/JP2009/052222
§ 371 (c)(1),
(2), (4) Date: Feb. 4, 2010

(87) PCT Pub. No.: WO2009/101935
PCT Pub. Date: Aug. 20, 2009

(65) Prior Publication Data
US 2011/0219762 A1    Sep. 15, 2011

(30) Foreign Application Priority Data
Feb. 15, 2008    (JP) .................................. 2008-34623

(51) Int. Cl.
*B60K 11/04* (2006.01)
*B60H 1/00* (2006.01)
*F28D 1/00* (2006.01)
(52) U.S. Cl. ............ 180/68.6; 165/41; 165/47; 165/149
(58) Field of Classification Search .................. 180/68.4, 180/68.6; 165/41, 47, 67, 149
See application file for complete search history.

(56) References Cited

U.S. PATENT DOCUMENTS

| | | | | | |
|---|---|---|---|---|---|
| 5,816,350 | A | * | 10/1998 | Akira et al. .................. | 180/68.1 |
| 6,068,675 | A | * | 5/2000 | Tsuda et al. .................. | 55/385.3 |
| 6,470,961 | B1 | * | 10/2002 | Case .............................. | 165/78 |
| 6,817,404 | B2 | * | 11/2004 | Frana-Guthrie et al. ........ | 165/43 |
| 7,255,189 | B2 | * | 8/2007 | Kurtz et al. .................. | 180/68.4 |
| 7,874,390 | B2 | * | 1/2011 | Taniuchi et al. ............. | 180/68.4 |
| 2004/0188061 | A1 | * | 9/2004 | Beck et al. ...................... | 165/67 |
| 2004/0226683 | A1 | * | 11/2004 | Esposito et al. ................ | 165/41 |
| 2006/0278365 | A1 | * | 12/2006 | Sanada et al. .................... | 165/41 |
| 2007/0246278 | A1 | * | 10/2007 | Honzek et al. ............... | 180/68.4 |
| 2008/0115746 | A1 | * | 5/2008 | Adamson et al. ............. | 123/41.3 |
| 2009/0145577 | A1 | * | 6/2009 | Shuttleworth et al. .......... | 165/47 |

FOREIGN PATENT DOCUMENTS

| | | |
|---|---|---|
| JP | 8-270444 A | 10/1996 |
| JP | 2003-41622 A | 2/2003 |
| JP | 2006-52689 A | 2/2006 |
| JP | 2006-82661 A | 3/2006 |
| JP | 2006-207862 A | 8/2006 |
| JP | 2006-224812 A | 8/2006 |

* cited by examiner

*Primary Examiner* — John R Olszewski
(74) *Attorney, Agent, or Firm* — Mattingly & Malur, PC

(57) ABSTRACT

A top cover (17) is provided at an upper position of a supporting structure (12) of heat exchange device (11), and an upper opening (20C) is configured to be provided in a detachable type cover (20) for constituting this top cover (17) at a position corresponding to a clearance (16) between a radiator (13) and an intercooler (15) which overlap in the flowing direction (A) of cooling air. Accordingly, when a cooling fan (7B) is rotatively driven, the upper opening (20C) allows cool cooling air to flow into the supporting structure (12) and to be supplied to the radiator (13) through the clearance (16) between the radiator (13) and the intercooler (15). As a result, only the radiator (13) which overlaps with the intercooler (15) can be efficiently cooled by the cool cooling air from the upper opening (20C).

7 Claims, 8 Drawing Sheets

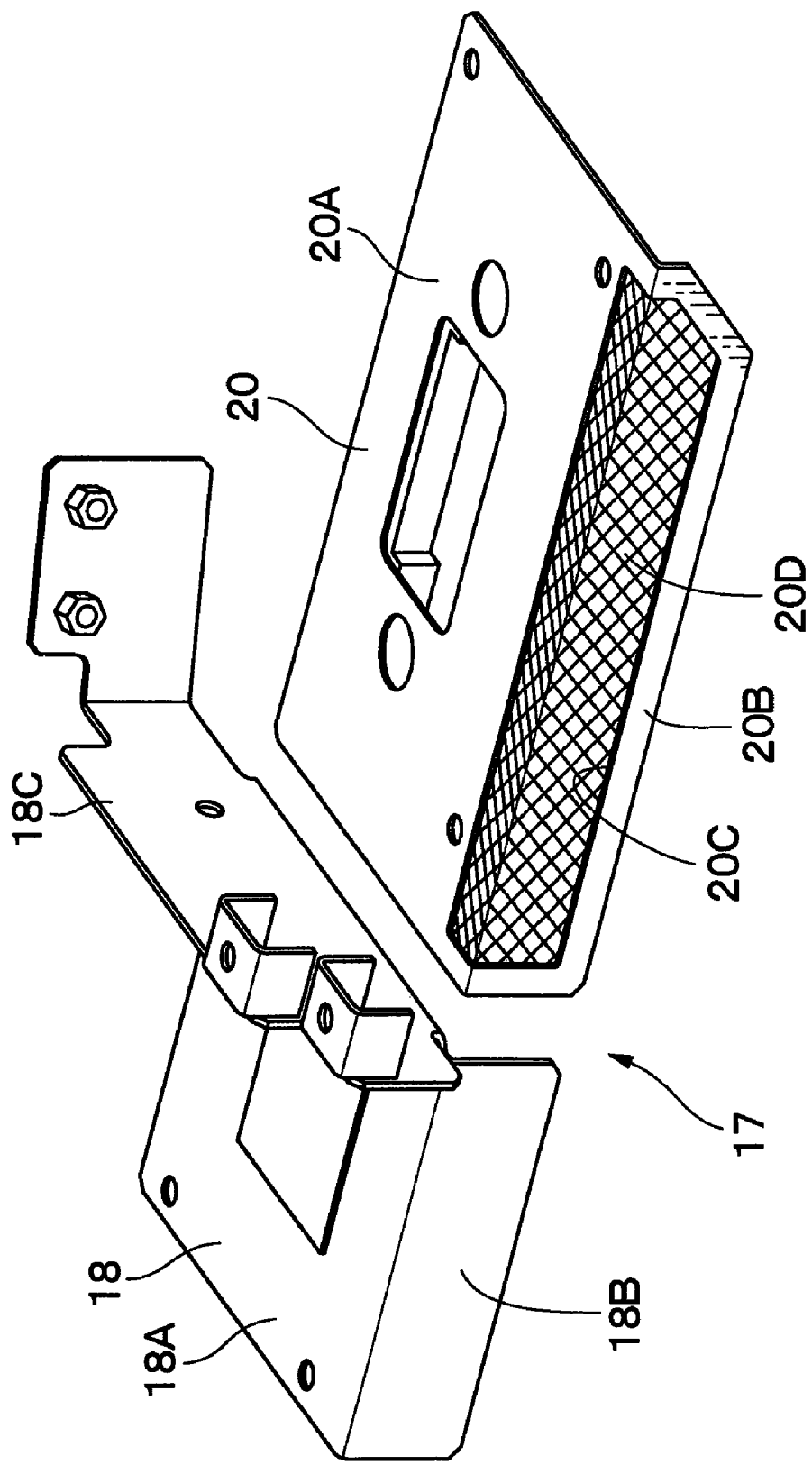

CONSTRUCTION MACHINE

TECHNICAL FIELD

The present invention relates to a construction machine which is used as, for example, a hydraulic excavator, a hydraulic crane, a dump truck, a lift truck, a bulldozer, or the like.

BACKGROUND ART

Generally, a hydraulic excavator is known as a typical example of construction machines, and this hydraulic excavator is constituted by an automotive lower traveling structure, an upper revolving structure which is swingably mounted on the lower traveling structure, and a working mechanism liftably mounted on the front side of the upper revolving structure.

The upper revolving structure is largely constituted by a revolving frame serving as a supporting structure, a cab which is provided on the front side of the revolving frame and in which an operator rides, an engine which is mounted on the rear side of the revolving frame to drive a hydraulic pump, heat exchange device provided in the vicinity of the engine, and an exterior cover for covering the engine, the heat exchange device, and the like.

Here, the heat exchange device is constituted by a plurality of heat exchangers, such as a radiator, an oil cooler, an intercooler, and the like, which are opposed to a cooling fan of the engine. In addition, in small-size hydraulic excavators in recent years, the radiator, the oil cooler, the intercooler, and the like are arranged in parallel to the flowing direction of the cooling air (in juxtaposition in the widthwise direction) in order to make effective use of the limited space of the upper revolving structure (see, for example, Patent Literature 1: Japanese Patent Laid-Open No. 2006-207862).

Meanwhile, in cases where the number of heat exchangers has increased or the installation space of the heat exchange device has become even smaller, not all the heat exchangers can be disposed in parallel. For this reason, among the heat exchange device, there is a type which is configured such that another heat exchanger is disposed overlappingly in series with a plurality of heat exchangers juxtaposed in parallel on the upstream side in the flowing direction of the cooling air (see, for example, Patent Literature 2: Japanese Patent Laid-Open No. 2006-224812).

Incidentally, with the hydraulic excavator according to the above-described Japanese Patent Literature 2, another heat exchanger is disposed overlappingly in series with the flowing direction of the cooling air on the upstream side of one group of heat exchangers juxtaposed in parallel. For this reason, cooling air which has become warm after passing through the upstream-side heat exchanger is supplied to the one group of heat exchangers located on the downstream side of the cooling air. For this reason, there is a problem in that, among the downstream-side heat exchangers, those portions that overlap with the upstream-side heat exchanger are poor in the cooling efficiency.

DISCLOSURE OF THE INVENTION

In view of the above-discussed problems with the prior art, it is an object of the present invention to provide a construction machine in which, even if heat exchangers are arranged partially overlappingly with respect to the flowing direction of the cooling air, the cooling air can be supplied actively to the heat exchangers located on the downstream side, thereby making it possible to enhance the efficiency of cooling by the heat exchangers located on the downstream side.

(1) A construction machine in accordance with the invention comprises a vehicle body on which a prime mover for driving a hydraulic pump is mounted; a working mechanism which is installed on the vehicle body and is operated by hydraulic oil supplied from the hydraulic pump; and heat exchange device which is installed on the vehicle body and cools a fluid by cooling air generated from a cooling fan.

Further, in order to solve the above-discussed problem, the present invention is characterized in that the heat exchanger is constituted by a supporting structure which is provided in an upright state on the vehicle body; a first heat exchanger which is provided in the supporting structure by being located upstream of the cooling fan in a flowing direction of the cooling air; a second heat exchanger which is provided in the supporting structure by being located upstream of the cooling fan in the flowing direction of the cooling air and by being juxtaposed in parallel to the first heat exchanger in the flowing direction of the cooling air; a third heat exchanger which is provided in the supporting structure with a clearance with respect to the first heat exchanger by being located further upstream of the first heat exchanger in the flowing direction of the cooling air; and a top cover provided on the supporting structure in such a manner as to cover upper positions of the first, second, and third heat exchangers, an upper opening being provided in the top cover at a position corresponding to the clearance so as to guide the cooling air into the clearance formed between the first heat exchanger and the third heat exchanger.

In the case where the third heat exchanger is thus disposed overlappingly in series with the flowing direction of the cooling air on the upstream side of the first heat exchanger, only the cooling air which has been warmed by the third heat exchanger would be supplied to the first heat exchanger, so that the cooling efficiency of the first heat exchanger would aggravate.

However, in the present invention, in the top cover which is provided on the supporting structure in such a manner as to cover upper positions of the first, second, and third heat exchangers, an upper opening is provided at a position corresponding to a clearance between the first heat exchanger and the third heat exchanger. By so doing, the upper opening is capable of supplying external cool cooling air to the clearance between the first heat exchanger and the third heat exchanger. As a result, the cool cooling air which flows in from the upper opening can be supplied to the first heat exchanger through the clearance, thereby making it possible to improve the cooling efficiency of the first heat exchanger.

Moreover, since the cool cooling air which is supplied from the upstream side is supplied to the second heat exchanger, it is possible to prevent the flow rate of the cooling air from declining due to the unnecessary intake of air. This also makes it possible to enhance the cooling efficiency of the first, second, and third heat exchangers. Moreover, three heat exchangers can be accommodated compactly in the supporting structure, and three or more heat exchangers can be mounted even on an ultra-small construction machine called a mini excavator.

(2) In this instance, according to the present invention, the top cover is constituted by a fixed type cover which is fixed so as to cover an upper side of the second heat exchanger and a detachable type cover which is detachably provided so as to cover upper sides of the first heat exchanger and the third heat exchanger and has the upper opening.

By virtue of this configuration, the second heat exchanger at its upper position is covered by the fixed type cover. As for the second heat exchanger, however, since its upstream side in the flowing direction of the cooling air is open, it is possible to easily perform the inspection operation, cleaning operation, and the like. Meanwhile, as for the first heat exchanger and the third heat exchanger, since their upper positions are covered by the detachable type cover, if this detachable type cover is removed, it is possible to easily perform the inspection operation, cleaning operation, and the like through the clearance with respect to the first heat exchanger concealed in the rear of the third heat exchanger.

(3) According to the present invention, the clearance is a space which constitutes a passage for the inspection and cleaning operation of the first heat exchanger and for the cooling air to flow into the first heat exchanger. Accordingly, the cooling air which flows in from the upper opening can be supplied toward the first heat exchanger through the clearance constituting the cooling air passage. In addition, in the state in which the detachable type cover is removed, it is possible to perform the inspection, cleaning, and other similar operation through the clearance.

(4) According to the present invention, the top cover is configured to be provided with a net member for dust prevention which covers the upper opening. Accordingly, it is possible to supply cooling air from which dust and the like have been removed by this net member. Hence, it is possible to prevent the first heat exchanger from becoming damaged and the dust and the like from being deposited, thereby making it possible to improve the reliability, maintenance workability, and the like.

(5) According to the present invention, the supporting structure is configured to be detachably provided with a dust preventive net for capturing dust in the cooling air by being located upstream of the first, second, and third heat exchangers in the flowing direction of the cooling air. By this configuration, this dust preventive net is capable of capturing dust in the cooling air, so that cooling air with dust and the like removed therefrom can be supplied to the heat exchangers. When the dust preventive net is removed, the dust and the like attached to this dust preventive net can be easily cleaned away. Further, with the dust preventive net removed, the first, second, and third heat exchangers can be exposed, making it possible to perform the inspection operation, cleaning operation, and the like thereof.

(6) According to the present invention, the first heat exchanger is a radiator for cooling cooling water of the prime mover, the second heat exchanger is an oil cooler for cooling hydraulic oil which is supplied to the hydraulic pump, and the third heat exchanger is an intercooler for cooling intake air which is supplied from a supercharger provided on the prime mover.

(7) According to the present invention, the supporting structure is constituted by a pair of side plates provided on both sides of the first, second, and third heat exchangers in such a manner as to sandwich them, an upper connecting member connecting the pair of side plates on their upper sides, and a lower connecting member connecting the pair of side plates on their lower sides, and the top cover is configured to be mounted at upper positions of the side plates and the upper connecting member.

As a result, the heat exchange device can be assembled as a single unit by mounting the first, second, and third heat exchangers to the supporting structure, and this heat exchange device can be installed on the vehicle body by means of the supporting structure. Further, the top cover can be fitted to upper positions of the side plates and the upper connecting member of the supporting structure.

(8) According to the present invention, the vehicle body is constituted by an automotive lower traveling structure and an upper revolving structure which is swingably provided on the lower traveling structure, wherein the upper revolving structure includes a revolving frame which is formed as a supporting structure and an engine which is mounted on the revolving frame in a transversely mounted state and extends in the left-right direction, the cooling fan being provided on one side in the left-right direction of the engine, the hydraulic pump being provided on another side thereof, and wherein the heat exchange device is configured to be installed on the revolving frame by being located on an upstream side in the flowing direction of the cooling air generated by the cooling fan.

BRIEF DESCRIPTION OF THE DRAWINGS

FIG. 2 is an enlarged plan view illustrating an upper revolving structure in FIG. 1 omitted a cab, an exterior cover, and the like;

FIG. 8 is an external perspective view illustrating the top cover in enlarged form.

DESCRIPTION OF REFERENCE NUMERALS

Figure 1:
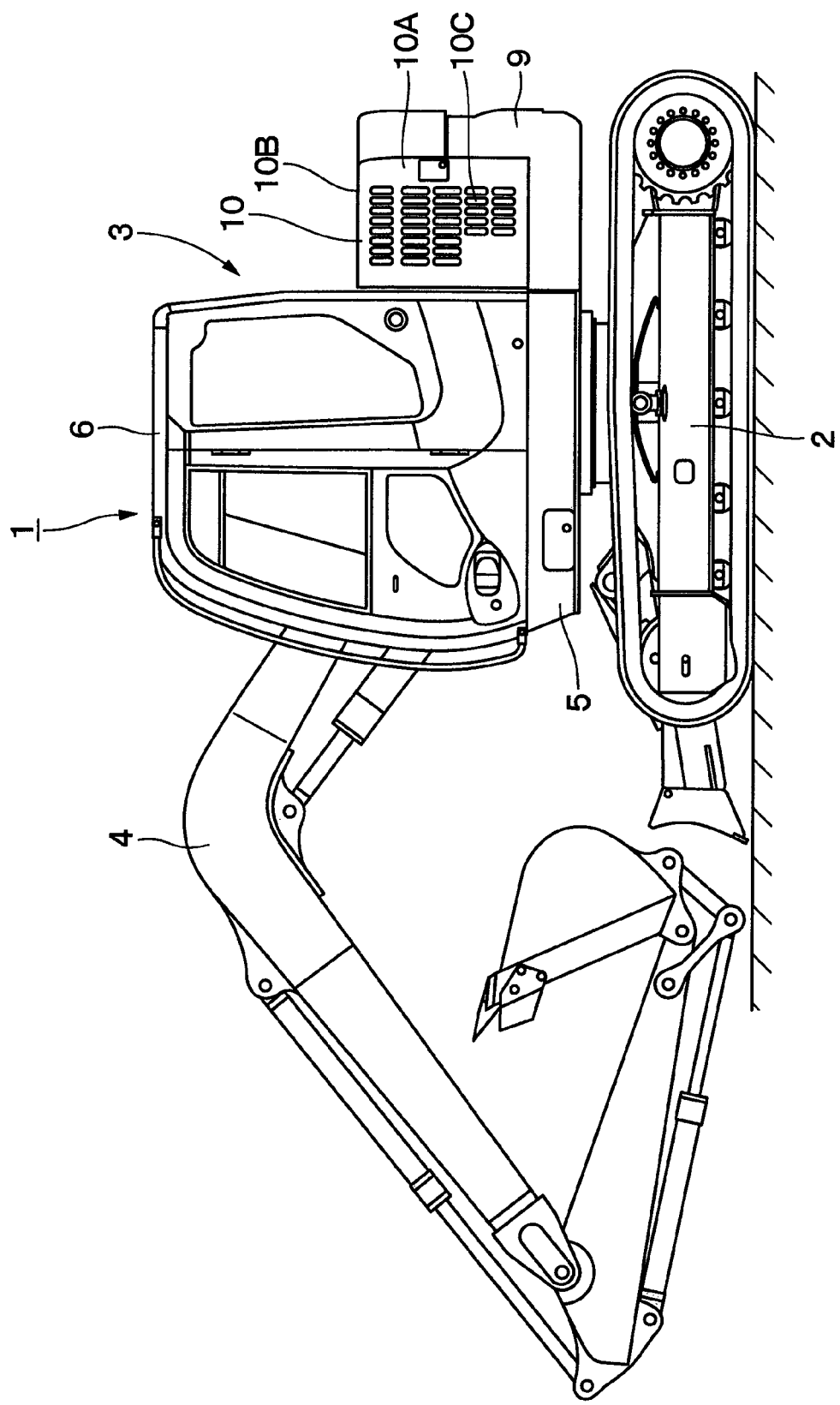
FIG. 1 is a front view illustrating a hydraulic excavator in accordance with an embodiment of the invention.

1: Hydraulic excavator (construction machine)
2: Lower traveling structure (vehicle body)
3: Upper revolving structure (vehicle body)
4: Working mechanism
5: Revolving frame
7: Engine (prime mover)
7A: Supercharger
7B: Cooling fan
8: Hydraulic pump
11: Heat exchange device
12: Supporting structure
12A: Front side plate
12B: Rear side plate
12C: Upper connecting member
12D: Lower connecting member
12E: Fan shroud
13: Radiator (first heat exchanger)
14: Oil cooler (second heat exchanger)
15: Intercooler (third heat exchanger)
16: Clearance
17: Top cover
18: Fixed type cover
18A, 20A: Horizontal surface portion
18B, 20B: Vertical surface portion
20: Detachable type cover
20C: Upper opening
20D: Net member
21: Dust preventive net
A: Flowing direction of cooling air

BEST MODE FOR CARRYING OUT THE INVENTION

Hereafter, with reference to FIGS. 1 to 8, a detailed description will be given by citing as an example a crawler type hydraulic excavator as a construction machine in accordance with an embodiment of the present invention.

In FIG. 1, designated at 1 is a crawler type hydraulic excavator as a construction machine, and the hydraulic excavator 1 is largely constituted by an automotive lower traveling structure 2, an upper revolving structure 3 which is swingably mounted on the lower traveling structure 2 and constitutes a vehicle body together with the lower traveling structure 2, and a working mechanism 4 liftably mounted on the front side of the upper revolving structure 3 to perform the operation of such as excavating earth and sand.

Figure 2:
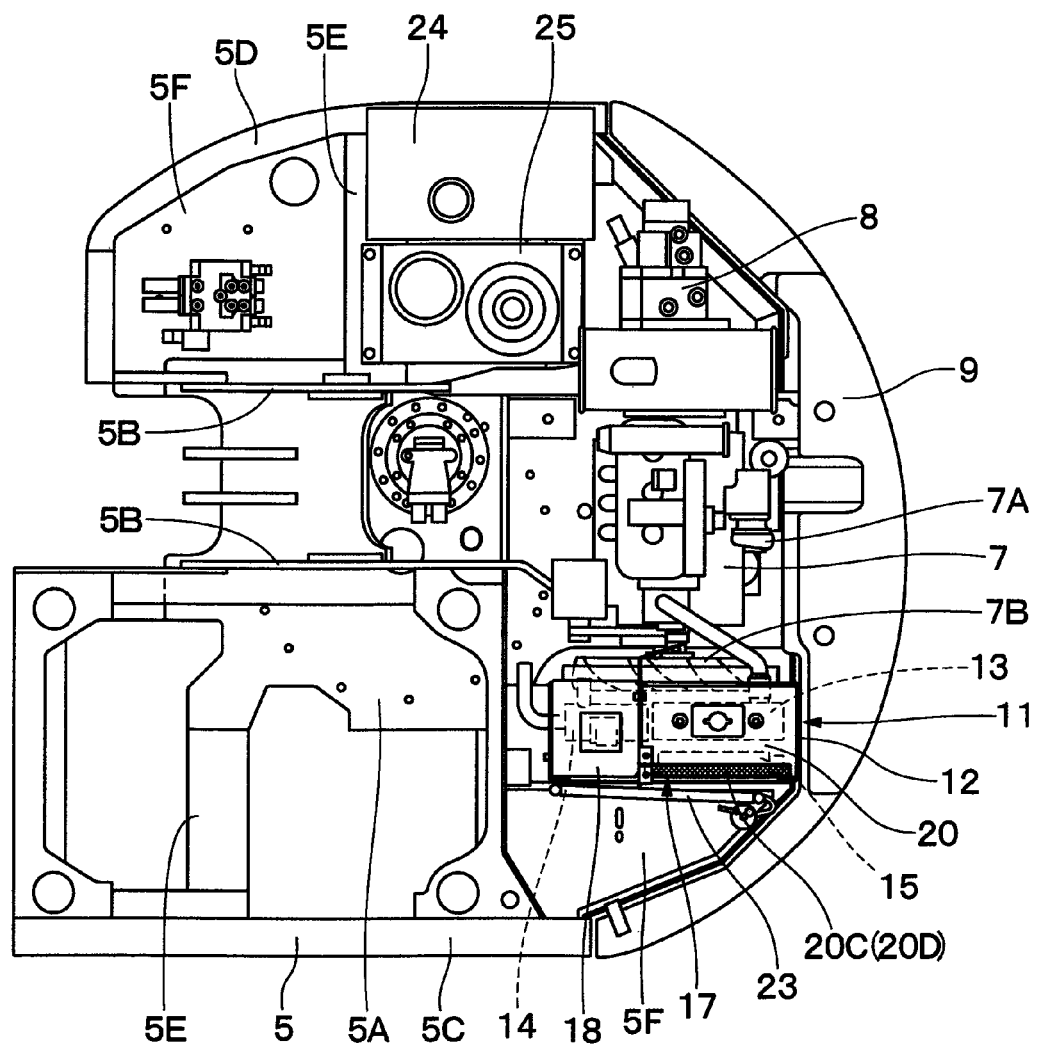

Designated at 5 is a revolving frame which constitutes the upper revolving structure 3, and the revolving frame 5 is formed as a supporting structure. Further, as shown in FIG. 2, the revolving frame 5 is largely constituted by a bottom plate 5A consisting of a thick-walled steel plate or the like extending in the front-back direction; left and right vertical plates 5B provided uprightly on the bottom plate 5A and extending in the front-back direction with a predetermined interval therebetween in the left-right direction; a left side frame 5C and a right side frame 5D each disposed at an interval with the respective one of the vertical plates 5B to the left or to the right and extending in the front-back direction; a plurality of transverse beams 5E jutting out from the bottom plate 5A and the vertical plate 5B in the left-right direction and adapted to support the left and right side frames 5C and 5D at their distal end portions; and a plurality of under covers 5F provided between the bottom plate 5A and the side frames 5C and 5D. Further, the working mechanism 4 is liftably mounted on the front sides of the left and right vertical plates 5B.

Denoted at 6 is a cab (see FIG. 1) which is mounted on the left front side of the revolving frame 5. This cab 6 is occupied by an operator. Disposed in its interior area driver's seat in which the operator is seated, an operation lever for traveling, an operation lever for work operation, an indoor unit of an air-conditioner, and the like (none are shown).

Indicated at 7 is an engine (see FIG. 2) serving as a prime mover which is provided on the rear side of the revolving frame 5. The engine 7 is mounted in a transversely mounted state in which it extends in the left-right direction, and has, for example, a supercharger 7A (turbocharger) for increasing the flow rate of intake air. An intake type cooling fan 7B is provided on the left side of the engine 7, and the cooling fan 7B circulates cooling air from an inlet port 10C of a below-described exterior cover 10 toward the engine 7 as the cooling fan 7B is rotatively driven. Further, a hydraulic pump 8, which discharges hydraulic oil as pressure oil by being driven by the engine 7, is mounted on the right side of the engine 7.

Designated at 9 is a counterweight which is mounted on a rear end portion of the revolving frame 5. This counterweight 9 is formed as a circular arc-shaped heavy load for keeping a weight balance with the working mechanism 4.

Indicated at 10 is the exterior cover which is provided over the revolving frame 5 by being located between the cab 6 and the counterweight 9. As shown in FIG. 1, this exterior cover 10 is largely constituted by left and right side plates 10A (only the left one is shown) located on both left and right sides of the revolving frame 5 and extending in the front-back direction; and a top plate 10B extending horizontally between upper end portions of the side plates 10A. Here, the inlet port 10C, into which the cooling air flows toward below-described heat exchange device 11 and the like, is formed in the left side plate 10A, while an outlet port (not shown), through which the cooling air after having passed through the heat exchange device 11, the engine 7, and the like flows to the outside, is formed in the right side plate.

Next, referring to FIGS. 2 to 8, a description will be given of the heat exchange device 11 in accordance with the embodiment which is used for cooling various fluids such as engine cooling water, hydraulic oil, and intake air by the cooling air.

Figure 3:
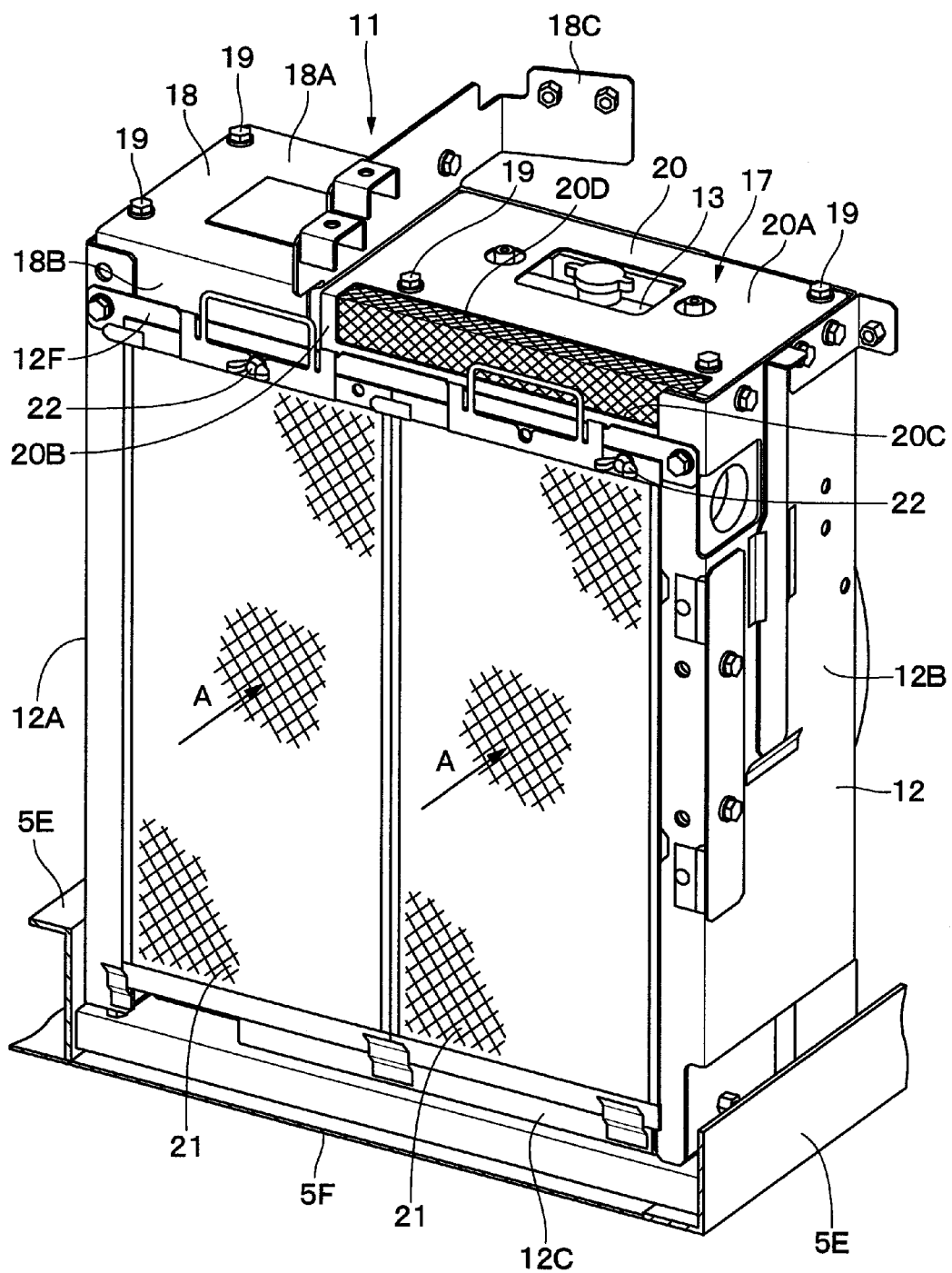
FIG. 3 is an external perspective view illustrating in enlarged form heat exchange device as a single unit.

In FIG. 2, designated at 11 is the heat exchange device provided inside the exterior cover 10 by being located on the left side of the engine 7. The heat exchange device 11 is fixed to a left-side position of the engine 7 between the cab 6 and the counterweight 9. In this case, the heat exchange device 11 is for cooling the various fluids which have undergone temperature rise by the cooling air derived from the cooling fan 7B. Further, as shown in FIGS. 3 to 5, the heat exchange device 11 is largely constituted by a supporting structure 12, a radiator 13, an oil cooler 14, an intercooler 15, a clearance 16, a top cover 17, and the like, which will be described hereinafter.

Denoted at 12 is the supporting structure which is provided in an upright state on the revolving frame 5 by being located on the left side of the engine 7. This supporting structure 12 is formed as a frame structure having strength for surrounding and supporting the radiator 13, the oil cooler 14, and the intercooler 15. The supporting structure 12 having strength also functions as a fixing bracket for fixing the radiator 13, the oil cooler 14, and the intercooler 15 to the revolving frame 5 side while supporting them. Further, the supporting structure 12 is able to guide the cooling air derived from the cooling fan 7B toward the radiator 13, the oil cooler 14, and the intercooler 15 in cooperation with the below-described top cover 17.

Figure 4:
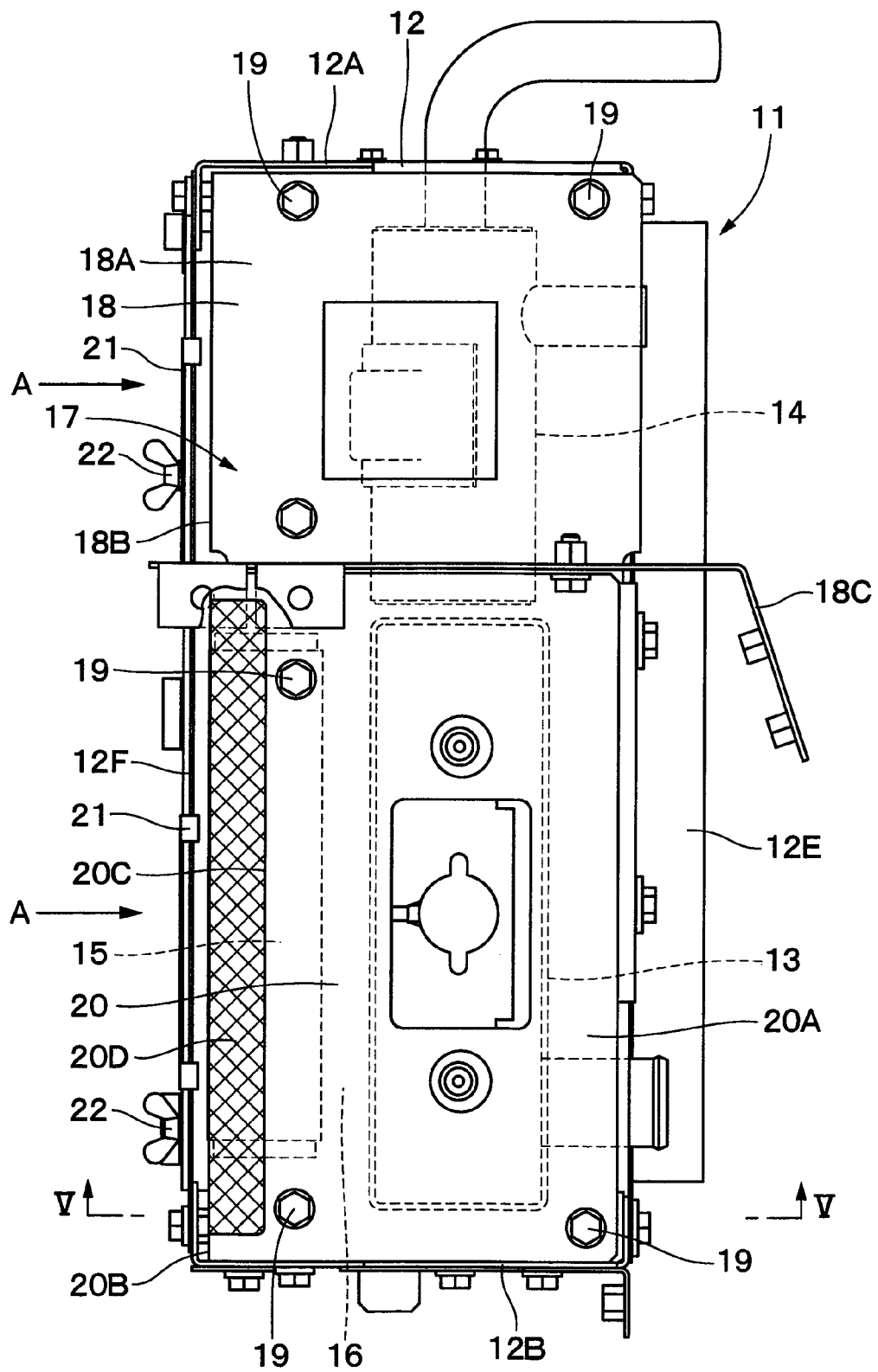
FIG. 4 is a plan view illustrating in enlarged form the heat exchange device as a single unit.
Figure 5:
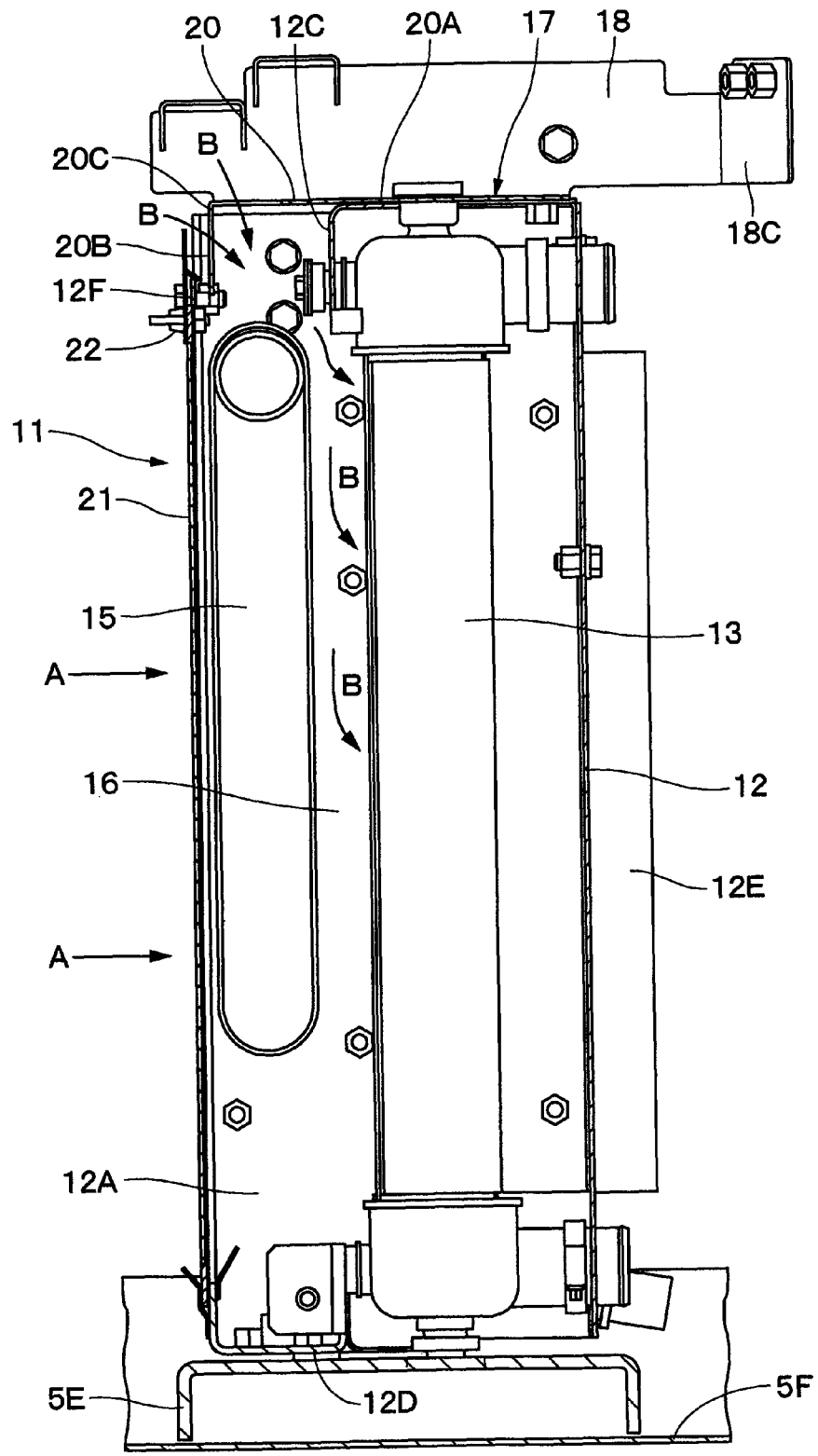
FIG. 5 is a cross-sectional view of the heat exchange device, taken in the direction of arrows V-V in FIG. 4.
Figure 7:
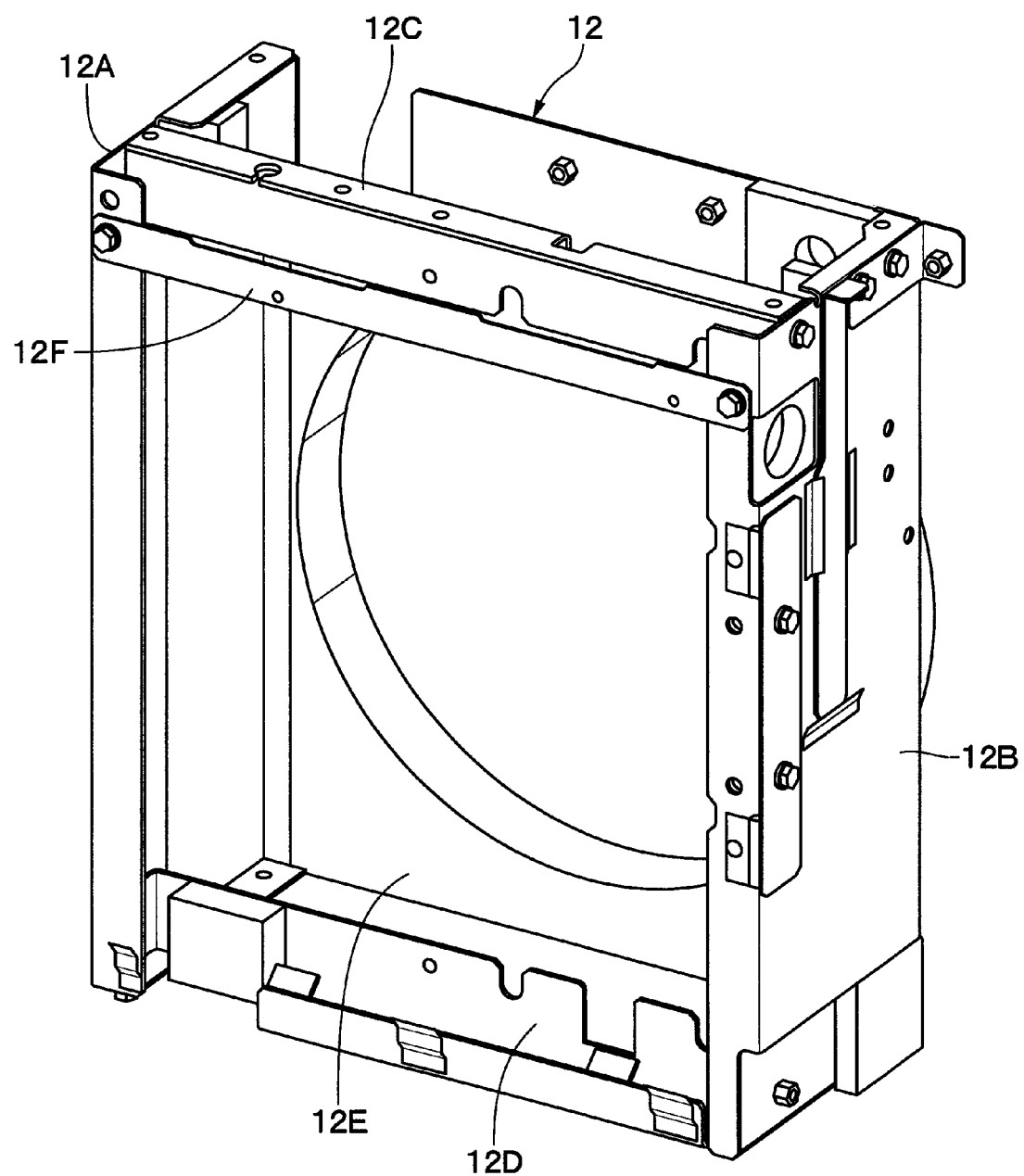
FIG. 7 is an external perspective view illustrating a supporting structure as a single unit.

Further, as shown in FIGS. 4 and 7, the supporting structure 12 is largely constituted by a front side plate 12A disposed on the rear surface side of the cab 6; a rear side plate 12B disposed on the counterweight 9 side in such a manner as to oppose the front side plate 12A with the radiator 13, the oil cooler 14, and the intercooler 15 interposed therebetween; an upper connecting member 12C connecting the pair of side plates 12A and 12B on their upper sides; a lower connecting member 12D connecting the pair of side plates 12A and 12B on their lower sides; and a fan shroud 12E provided on the right side with respect to the pair of side plates 12A and 12B and surrounding the cooling fan 7B of the engine 7. In addition, a latching plate 12F is provided on upper sides of the side plates 12A and 12B by being located on the left side of the upper connecting member 12C, and an upper portion of a below-described dust preventive net 21 is latched by the latching plate 12F.

Here, the supporting structure 12 is capable of mounting the radiator 13, the oil cooler 14, and the intercooler 15 to the upper connecting member 12C and the lower connecting member 12D. In this state, as the front side plate 12A and the rear side plate 12B of the supporting structure 12 are mounted at their lower positions to the revolving frame 5, it is possible to fix the radiator 13, the oil cooler 14, and the intercooler 15 to the revolving frame 5 side.

It should be noted that since the supporting structure 12 is mounted to strength members such as the bottom plate 5A and the transverse beams 5E of the revolving frame 5 to have its lower side closed, the supporting structure 12 in the embodiment does not require a bottom plate for closing its lower side. However, in order to ensure the flow of cooling air at the supporting structure 12, the supporting structure 12 may be provided with a bottom plate (not shown), and the supporting structure 12 may be constituted by the front side plate 12A, the rear side plate 12B, the upper connecting member 12C, the lower connecting member 12D, the bottom plate, and the like.

Denoted at 13 is the radiator serving as a first heat exchanger provided in the supporting structure 12 in face-to-face relation to the cooling fan 7B of the engine 7. The radiator 13 is for cooling the engine 7 by radiating the heat of the cooling water in the engine 7. Further, the radiator 13 is disposed by being located upstream of the cooling fan 7B in the flowing direction A of the cooling air which flows through the exterior cover 10 from the left to the right.

Indicated at 14 is the oil cooler serving as a second heat exchanger. The oil cooler 14 is for cooling the hydraulic oil which is returned to a below-described hydraulic oil tank 25, namely, the hydraulic oil which is supplied to the hydraulic pump 8. The oil cooler 14 is disposed by being arranged forwardly of the radiator 13 (cab 6 side) in the front-back direction, so as to be located upstream of the cooling fan 7B in the flowing direction A of the cooling air and to be parallel to the radiator 13 in the flowing direction A of the cooling air.

Figure 6:
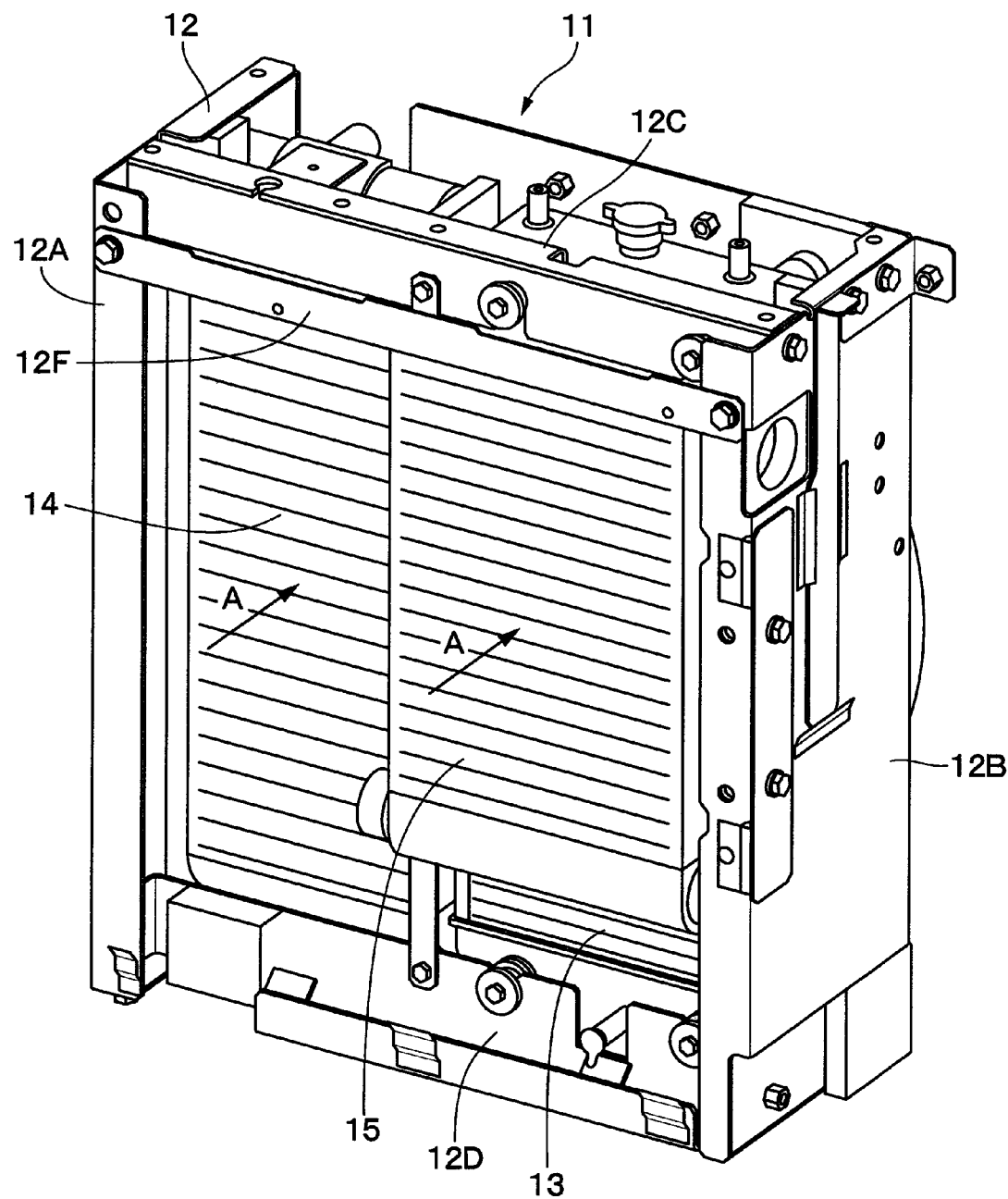
FIG. 6 is an external perspective view illustrating a state in which a top cover and a dust preventive net are removed from the heat exchange device shown in FIG. 3.

Designated at 15 is the intercooler serving as a third heat exchanger. The intercooler 15 is for cooling the intake air which is supplied from the supercharger 7A of the engine 7. The intercooler 15 is provided upstream of the radiator 13 in the flowing direction A of the cooling air, namely, on the opposite side to the cooling fan 7B with the radiator 13 interposed therebetween. Accordingly, the radiator 13 and the intercooler 15 are disposed in series so as to be juxtaposed in the left-right direction with respect to the revolving frame 5. Further, as shown in FIGS. 4 to 6, the intercooler 15 is arranged so as to cover over from an intermediate portion to almost all of the upper side of the radiator 13 over its substantially entire length in the front-back direction, excluding a lower portion thereof.

Here, as shown in FIGS. 4 and 5, the radiator 13 and the intercooler 15 are arranged with the clearance 16 therebetween in the left-right direction (flowing direction A of the cooling air). Further, this clearance 16 is such an interval dimension that makes it possible to perform, for example, the inspection operation, cleaning operation, and the like of the radiator 13. The clearance 16 also serves as a space constituting a cooling air passage into which the cooling air flows from an upper opening 20C of a below-described detachable type cover 20 toward the radiator 13 in the direction of arrow B in FIG. 5.

Next, a description will be given of the top cover 17 which is provided at an upper position of the supporting structure 12 and constitutes a portion of the heat exchange device 11.

This top cover 17 extends in the front-back direction in such a manner as to span between the front side plate 12A and the rear side plate 12B of the supporting structure 12, and is mounted at upper positions of the side plates 12A and 12B and the upper connecting member 12C so as to cover upper sides of the radiator 13, the oil cooler 14, and the intercooler 15.

Here, as the top cover 17 is mounted at the upper position of the supporting structure 12, the top cover 17, together with the front side plate 12A and the rear side plate 12B, is thereby able to guide the cooling air toward the radiator 13, the oil cooler 14, and the intercooler 15. In addition, as the top cover 17 closes the upper position of the supporting structure 12, the top cover 17 is able to prevent the warm cooling air which has passed through the radiator 13, the oil cooler 14, and the intercooler 15 from being sucked again. Further, the top cover 17 is able to form this supporting structure 12 into a high-strength box structure in cooperation with the supporting structure 12.

Further, the top cover 17 is largely constituted by a fixed type cover 18 which is provided on the front side of the supporting structure 12 so as to cover the upper side of the oil cooler 14 and is fixedly mounted by using bolts 19 and a detachable type cover 20 which is provided on the rear side of the supporting structure 12 so as to cover the upper sides of the radiator 13 and the intercooler 15 and is detachably mounted by using bolts 19.

Namely, designated at 18 is the fixed type cover for constituting a front side portion (cab 6 side) of the top cover 17 extending in the front-back direction. As shown in FIG. 8, the fixed type cover 18 is formed by bending peripheries of a metal plate, for example. Namely, the fixed type cover 18 has a horizontal surface portion 18A in the form of a horizontal plane which covers the upper side of the oil cooler 14 and a vertical surface portion 18B in the form of a vertical plane extending downward after being bent at a left-side end portion of the horizontal surface portion 18A. Meantime, as an end portion on the rear side of the fixed type cover 18 is bent upward, a bracket 18C is integrally formed in the fixed type cover 18, and other parts (not shown) concerning the revolving frame 5, the exterior cover 10, the engine 7, the heat exchange device 11, and the like are mounted to that bracket 18C.

Further, as shown in FIGS. 3 and 4, the fixed type cover 18 is fixed to the front side plate 12A and the upper connecting member 12C by using the plurality of bolts 19. Here, since the fixed type cover 18 is fixed by using the bolts 19, the fixed type cover 18 can conceivably be dismounted easily by removing these bolts 19. However, since the fixed type cover 18 supports other parts by the bracket 18C, the fixed type cover 18 is difficult to dismount with the heat exchange device 11 installed on the upper revolving structure 3, and is substantially in a fixed state. It should be noted that the fixed type cover 18 may be so configured as to be integrally secured by using a welding, caulking, or other similar means without using the bolts 19.

Indicated at 20 is the detachable type cover for constituting a rear side portion (counterweight 9 side) of the top cover 17. In substantially the same way as the fixed type cover 18, the detachable type cover 20 is formed by bending peripheries of a metal plate. Namely, the detachable type cover 20 has a horizontal surface portion 20A in the form of a horizontal plane which covers upper sides of the radiator 13 and the intercooler 15; a vertical surface portion 20B in the form of a vertical plane extending downward after being bent at a left-side end portion of that horizontal surface portion 20A; the upper opening 20C provided at a corner portion in such a manner as to span between the horizontal surface portion 20A and the vertical surface portion 20B; and a net member 20D provided in that upper opening 20C.

Next, a detailed description will be given of the upper opening 20C of the detachable type cover 20. This upper opening 20C is for guiding and supplying the cooling air into the clearance 16 formed between the radiator 13 and the intercooler 15. For this reason, as shown in FIGS. 4 and 5, the upper opening 20C is formed with a greater length dimension than the length dimension of the intercooler 15 in the front-back direction, and is disposed above the intercooler 15. Here, as for the radiator 13, since the intercooler 15 which serves as an obstacle is provided on the upstream side in the flowing direction A of the cooling air, the cooling air would be disadvantageously warmed by the intercooler 15. Accordingly, in order to supply cooling air to the radiator 13 for which cooling air from above is required, the upper opening 20C is adapted to guide the cooling air to the radiator 13 through the clearance 16 between the radiator 13 and the intercooler 15.

In this case, since the upper opening 20C is provided over the two different planes of the transverse surface portion 20A and the vertical surface portion 20B, the cooling air can be fetched from both directions, namely, the vertical direction and the horizontal direction, and a large opening area can be obtained with a small space. In consequence, the upper opening 20C is able to efficiently supply the cooling air to the radiator 13 through the clearance 16.

Meanwhile, the net member 20D of the detachable type cover 20 is formed by a mesh-like body covering the upper opening 20C. In consequence, the net member 20D has a function similar to that of the below-described dust preventive net 21 and is able to supply to the radiator 13 cooling air with dust and the like removed therefrom.

As shown in FIGS. 3 and 4, the detachable type cover 20 thus configured can be mounted to the rear side plate 12B, the upper connecting member 12C, and the like by using the plurality of bolts 19. On the other hand, the detachable type cover 20 can be easily dismounted from the supporting structure 12 by loosening and removing the bolts 19. Further, when the detachable type cover 20 is dismounted, it is possible to easily perform the cleaning operation, inspection operation, repair operation, and the like of the net member 20D and the radiator 13.

Designated at 21 are, for example, two dust preventive nets provided on the supporting structure 12. The dust preventive nets 21 are for capturing dust in the cooling air flowing in from the inlet port 10C of the exterior cover 10. The dust preventive nets 21 are provided on the supporting structure 12 at a position upstream of the radiator 13, the oil cooler 14, and the intercooler 15 in the flowing direction A of the cooling air, and are arranged by being juxtaposed in the front-back direction. Further, the two dust preventive nets 21 are detachably latched to the lower connecting member 12D and the latching plate 12F of the supporting structure 12, and are fixed by wing nuts 22 so as not to be disengaged.

It should be noted that, as shown in FIG. 2, indicated at 23 is a condenser mounted to the supporting structure 12 by being located upstream (on the left side) of the dust preventive nets 21 in the flowing direction A of the cooling air. The condenser 23 constitutes a part of the outdoor unit of the air-conditioner, and is for providing cooling by radiating the heat kept in a refrigerant compressed by a compressor. In addition, denoted at 24 is a fuel tank provided on the right side of the revolving frame 5, and designated at 25 is the hydraulic oil tank provided on the left side of that fuel tank 24.

The hydraulic excavator 1 in accordance with this embodiment has the above-described configuration, and a description will be given hereinafter of the operation of this hydraulic excavator 1.

First, the operator rides in the cab 6 and is seated in the driver's seat. In this state, as the operator who is seated in the driver's seat manipulates the operation lever for traveling, the lower traveling structure 2 can be driven to move the hydraulic excavator 1 forward or backward. As the operator who is seated in the driver's seat manipulates the operation lever for work operation, it is possible to perform such as the operation of excavating earth and sand by lowering and raising the working mechanism 4.

When the hydraulic excavator 1 is thus being operated, the intake type cooling fan 7B installed at the engine 7 causes air to flow in from the inlet port 10C of the exterior cover 10. This air is supplied to the radiator 13, the oil cooler 14, and the intercooler 15 of the heat exchange device 11 as cooling air, and is thereby capable of cooling the fluids flowing in the respective ones thereof.

At this time, the supporting structure 12 together with the top cover 17 is capable of guiding the cooling air toward the radiator 13, the oil cooler 14, and the intercooler 15. Since the supporting structure 12 at its upper position is closed by the top cover 17 to form a closed space, it is possible to prevent warm cooling air which has passed through the radiator 13, the oil cooler 14, and the intercooler 15 from being sucked again (being recirculated).

Furthermore, since a high-strength box structure is formed by the supporting structure 12 and the top cover 17, it is possible to stably support the radiator 13, the oil cooler 14, and the intercooler 15 within the supporting structure 12. In this state, the radiator 13, the oil cooler 14, and the intercooler 15 can be reliably fixed to the revolving frame 5 side.

Meanwhile, as the intercooler 15 is disposed on the upstream side of the radiator 13, cooling air which has been warmed by the intercooler 15 would be supplied to the downstream-side radiator 13.

However, the top cover 17 is provided at the upper position of the supporting structure 12, and in the detachable type cover 20 for constituting this top cover 17, the upper opening 20C is provided at a position corresponding to the clearance 16 between the radiator 13 and the intercooler 15. In consequence, when the cooling fan 17B is rotatively driven, external cool cooling air flows into the supporting structure 12 from the upper opening 20C, passes through the clearance 16 between the radiator 13 and the intercooler 15, and is circulated toward the radiator 13, as indicated at arrow B in FIG. 5. Accordingly, the radiator 13 is capable of enhancing the cooling efficiency by the external cool air.

As such, according to this embodiment, the radiator 13 and the oil cooler 14 are provided in parallel to the flowing direction A of the cooling air, and the intercooler 15 is provided on the upstream side of the radiator 13. As a result, three heat exchangers consisting of the radiator 13, the oil cooler 14, and the intercooler 15 can be accommodated compactly in the supporting structure 12, and four or more heat exchangers with the addition of the condenser 23 can be mounted even on the small-size hydraulic excavator 1.

Meanwhile, since the supporting structure 12 is formed as a frame structure having strength, the supporting structure 12 is capable of reliably supporting the radiator 13, the oil cooler 14, and the intercooler 15 by surrounding them. The supporting structure 12 having strength is capable of reliably fixing the radiator 13, the oil cooler 14, and the intercooler 15 to the revolving frame 5 side. Further, the supporting structure 12 is capable of guiding the cooling air derived from the cooling fan 7B toward the radiator 13, the oil cooler 14, and the intercooler 15, making it possible to enhance the cooling efficiency by the radiator 13, the oil cooler 14, and the intercooler 15.

Here, the arrangement provided is such that, in the top cover 17 provided on the supporting structure 12 in such a manner as to cover upper sides of the radiator 13, the oil cooler 14, and the intercooler 15, the upper opening 20C is provided not in its entirety but in the detachable type cover 20 located at a position corresponding to the clearance 16 between the radiator 13 and the intercooler 15.

Accordingly, the upper opening 20C of the detachable type cover 20 is able to supply cool cooling air through the clearance 16 to the radiator 13 concealed by the intercooler 15. As a result, the radiator 13 is able to efficiently cool by this cooling air and is able to improve reliability as the heat exchanger.

Moreover, since the detachable type cover 20 is provided with the upper opening 20C at a position corresponding to the clearance 16, the cooling air through this upper opening 20C can be supplied only to the radiator 13. In this case, as for the oil cooler 14 for which there is no obstacle on its upstream side, only the usual cooling air which is supplied from the upstream side is supplied to it, thereby making it possible to prevent the flow rate of the cooling air from declining due to the unnecessary intake of air. This also makes it possible to enhance the cooling efficiency of such as the radiator 13, the oil cooler 14, and the intercooler 15.

Since the top cover 17 forms a closed space by closing the supporting structure 12 at its upper position, it is possible to guide the cooling air toward the radiator 13, the oil cooler 14, and the intercooler 15 and prevent warm cooling air which has passed through the radiator 13, the oil cooler 14, and the intercooler 15 from being sucked again (being recirculated).

Next, since the detachable type cover 20 is configured to cover the upper opening 20C by the net member 20D for dust prevention, cooling air from which dust and the like have been removed by this net member 20D can be supplied to the radiator 13. Accordingly, it is possible to prevent the radiator 13 from becoming damaged and the dust and the like from being deposited, thereby making it possible to improve the reliability, maintenance workability, and the like.

In addition, the configuration provided is such that the upper side of the oil cooler 14 is covered by the fixed type cover 18 of the top cover 17, and the upper sides of the radiator 13 and the intercooler 15 are covered by the detachable type cover 20 thereof. In this case, as for the oil cooler 14, since its upstream side in the flowing direction A of the cooling air is open, it is possible to easily perform the inspection operation, cleaning operation, and the like. Meanwhile, as for the radiator 13, since its upper side is covered by the detachable type cover 20, if this detachable type cover 20 is removed, it is possible to inspect and clean through the clearance 16 the radiator 13 concealed by the intercooler 15.

On the other hand, the dust preventive nets 21 are provided on the upstream side of the radiator 13, the oil cooler 14, and the intercooler 15, it is possible to capture dust in the cooling air, so that cooling air with dust and the like removed therefrom can be supplied to the radiator 13, the oil cooler 14, and the intercooler 15. Further, when the dust preventive nets 21 are removed, the dust and the like attached to the dust preventive nets 21 can be easily cleaned away. In addition, with the dust preventive nets 21 removed, the oil cooler 14 and the intercooler 15 can be exposed, making it possible to perform the inspection operation, cleaning operation, and the like thereof.

Further, the supporting structure 12 of the heat exchange device 11 is formed by sandwiching the radiator 13, the oil cooler 14, and the intercooler 15 by the front side plate 12A and the rear side plate 12B from both sides in the front-back direction (longitudinal direction), and by connecting the pair of side plates 12A and 12B by the upper connecting member 12C and the lower connecting member 12D. Accordingly, the supporting structure 12 can be formed with high strength, and the heat exchange device 11 can be assembled by mounting the radiator 13, the oil cooler 14, and the intercooler 15 within that supporting structure 12.

Further, the heat exchange device 11 can be mounted to the revolving frame 5 by means of the supporting structure 12. The top cover 17 can be mounted at the position where it covers the upper sides of the radiator 13, the oil cooler 14, and the intercooler 15 by making use of the side plates 12A and 12B and the upper connecting member 12C of the supporting structure 12.

It should be noted that a description has been given by citing as an example the case in which the supporting structure 12 of the heat exchange device 11 is configured to connect the front side plate 12A and the rear side plate 12B by the upper connecting member 12C and the lower connecting member 12D, and the top cover 17 is arranged to be mounted at the upper position. However, the present invention is not limited to the same, and the supporting structure may be provided with a bottom plate, the supporting structure being thus constituted by the front side plate, the rear side plate, the upper connecting member, the lower connecting member, the bottom plate, and the like. In this case, the flow of cooling air can be secured by the supporting structure.

In the embodiment, a description has been given by citing as an example the case in which the radiator 13 and the oil cooler 14 are disposed in parallel to the flowing direction A of the cooling air, and the intercooler 15 is disposed on the upstream side of the radiator 13. However, the present invention is not limited to the same, and the intercooler 15 may be arranged to be disposed on the upstream side of the oil cooler 14, for example. In addition, a configuration may be provided such that the radiator 13 and the intercooler 15 are disposed in parallel, and the oil cooler 14 may be disposed on the upstream side of the radiator 13 or the intercooler 15. Still alternatively, a heat exchange device such as a condenser of an air-conditioner, a fuel cooler, or the like may be applied instead of the intercooler 15.

Further, in the embodiment, a description has been given by citing as an example the case in which the engine 7 is provided with the cooling fan 7B. However, the present invention is not limited to the same, and a configuration may be provided such that, for example, the cooling fan is provided separately from the engine, and this cooling fan is rotatively driven by use of an electric motor, a hydraulic motor, or the like so as to supply cooling air to the heat exchange device.

Meanwhile, in the embodiment, a description has been given by citing as an example the case in which the two dust preventive nets 21 are fitted to the supporting structure 12. However, the present invention is not limited to the same, and the dust preventive net may, for example, consist of one piece, or may be configured to be divided in three or more pieces.

Further, in the embodiment, a description has been given by citing as an example of construction machines the hydraulic excavator 1 having the crawler type lower traveling structure 2. However, the present invention is not limited to the same, and may be applied to a hydraulic excavator having, for example, a wheel type lower traveling structure.

Furthermore, the present invention is not limited to a construction machine of the type in which the vehicle body is comprised of the lower traveling structure 2 and the upper revolving structure 3 as in the hydraulic excavator 1, and may be widely applied to other types of construction machines equipped with heat exchange device. Namely, the present invention is also applicable to construction machines of the type in which the vehicle body is comprised of a single member, such as a wheel loader, a dump truck, a bulldozer, and the like.

The invention claimed is:

1. A construction machine comprising: a vehicle body on which a prime mover for driving a hydraulic pump is mounted; a working mechanism which is installed on said vehicle body and is operated by hydraulic oil supplied from said hydraulic pump; and heat exchange device which is installed on said vehicle body and cools a fluid by cooling air generated from a cooling fan, wherein said heat exchange device is constituted by:
a supporting structure which is provided in an upright state on said vehicle body;
a first heat exchanger which is provided in said supporting structure by being located upstream of said cooling fan in a flowing direction (A) of the cooling air;
a second heat exchanger which is provided in said supporting structure by being located upstream of said cooling fan in the flowing direction (A) of the cooling air and by being juxtaposed in parallel to said first heat exchanger in the flowing direction (A) of the cooling air;

a third heat exchanger which is provided in said supporting structure with a clearance with respect to said first heat exchanger by being located further upstream of said first heat exchanger in the flowing direction (A) of the cooling air;

a top cover provided on said supporting structure in such a manner as to cover upper positions of said first, second, and third heat exchangers, wherein said top cover is constituted by a fixed type cover which is fixed so as to cover an upper side of said second heat exchanger and a detachable type cover which is detachably provided so as to cover upper sides of said first heat exchanger and said third heat exchanger, and an upper opening being provided in said detachable type cover at a position corresponding to said clearance so as to guide the cooling air into said clearance formed between said first heat exchanger and said third heat exchanger.

2. The construction machine according to claim 1, wherein said clearance is a space which constitutes a passage for the inspection and cleaning operation of said first heat exchanger and for the cooling air to flow into said first heat exchanger.

3. The construction machine according to claim 1, wherein said top cover is configured to be provided with a net member for dust prevention which covers said upper opening.

4. The construction machine according to claim 1, wherein said supporting structure is configured to be detachably provided with a dust preventive net for capturing dust in the cooling air by being located upstream of said first, second, and third heat exchangers in the flowing direction (A) of the cooling air.

5. The construction machine according to claim 1, wherein said first heat exchanger is a radiator for cooling water of said prime mover, said second heat exchanger is an oil cooler for cooling hydraulic oil which is supplied to said hydraulic pump, and said third heat exchanger is an intercooler for cooling intake air which is supplied from a supercharger provided on said prime mover.

6. The construction machine according to claim 1, wherein said vehicle body is constituted by an automotive lower traveling structure and an upper revolving structure which is swingably provided on said lower traveling structure, wherein said upper revolving structure includes a revolving frame which is formed as a supporting structure, said prime mover is mounted on said revolving frame in a transversely mounted state and extends in the left-right direction, said cooling fan being provided on one side in the left-right direction of said prime mover, and said hydraulic pump being provided on another side thereof, and wherein said heat exchange device is configured to be installed on said revolving frame by being located on an upstream side in the flowing direction (A) of the cooling air generated by said cooling fan.

7. A construction machine, comprising: a vehicle body on which a prime mover for driving a hydraulic pump is mounted; a working mechanism which is installed on said vehicle body and is operated by hydraulic oil supplied from said hydraulic pump; and heat exchange device which is installed on said vehicle body and cools a fluid by cooling air generated from a cooling fan, wherein said heat exchange device is constituted by:

a supporting structure which is provided in an upright state on said vehicle body;

a first heat exchanger which is provided in said supporting structure by being located upstream of said cooling fan in a flowing direction (A) of the cooling air;

a second heat exchanger which is provided in said supporting structure by being located upstream of said cooling fan in the flowing direction (A) of the cooling air and by being juxtaposed in parallel to said first heat exchanger in the flowing direction (A) of the cooling air;

a third heat exchanger which is provided in said supporting structure with a clearance with respect to said first heat exchanger by being located further upstream of said first heat exchanger in the flowing direction (A) of the cooling air; and a top cover provided on said supporting structure in such a manner as to cover upper positions of said first, second, and third heat exchangers, an upper opening being provided in said top cover at a position corresponding to said clearance so as to guide the cooling air into said clearance formed between said first heat exchanger and said third heat exchanger, and wherein said supporting structure is constituted by a pair of side plates provided on both sides of said first, second, and third heat exchangers in such a manner as to sandwich them, an upper connecting member connecting said pair of side plates on their upper sides, and a lower connecting member connecting said pair of side plates on their lower sides, and said top cover is configured to be mounted at upper positions of said side plates and said upper connecting member.

* * * * *